United States Patent
Ennin et al.

(10) Patent No.: US 8,376,413 B2
(45) Date of Patent: Feb. 19, 2013

(54) CONNECTION DEVICE

(75) Inventors: John Ennin, Erlensee (DE); Timo Teichmann, Mömbris (DE); Anja Haberland, Biebergemünd (DE); Andre Enders, Baeretswil (CH)

(73) Assignee: Veritas AG, Gelnhausen (DE)

( * ) Notice: Subject to any disclaimer, the term of this patent is extended or adjusted under 35 U.S.C. 154(b) by 756 days.

(21) Appl. No.: 11/723,080

(22) Filed: Mar. 16, 2007

(65) Prior Publication Data

US 2007/0216162 A1 Sep. 20, 2007

(30) Foreign Application Priority Data

Mar. 17, 2006 (DE) .................. 10 2006 012 410

(51) Int. Cl.
*F16L 23/00* (2006.01)

(52) U.S. Cl. ......... 285/406; 285/205; 285/242; 285/364

(58) Field of Classification Search .......... 285/205–206, 285/208, 242, 259, 332.1, 364, 368, 406, 285/412, 414, 222.1–222.5, 328
See application file for complete search history.

(56) References Cited

U.S. PATENT DOCUMENTS

| | | | | |
|---|---|---|---|---|
| 48,709 A * | 7/1865 | Emery | ........................... | 285/251 |
| 824,753 A * | 7/1906 | Stephens | ....................... | 285/246 |
| 951,516 A * | 3/1910 | Stephens | ................... | 285/148.13 |
| 964,579 A * | 7/1910 | Stephens | ................... | 285/148.13 |
| 969,216 A * | 9/1910 | Stephens | ....................... | 285/247 |
| 993,155 A * | 5/1911 | De Salme | ..................... | 285/247 |
| 1,235,876 A * | 8/1917 | Cave | ............................. | 285/247 |
| 2,146,218 A * | 2/1939 | Kimmich et al. | .......... | 285/222.2 |
| 2,298,736 A * | 10/1942 | Harpfer | ......................... | 285/368 |
| 2,853,320 A * | 9/1958 | Liebelt et al. | ................. | 285/247 |
| 2,973,975 A * | 3/1961 | Ramberg et al. | ........... | 285/222.1 |
| 3,047,937 A * | 8/1962 | De Vecchi | ................... | 29/890.14 |
| 3,228,096 A * | 1/1966 | Albro | ......................... | 29/890.15 |
| 3,399,908 A * | 9/1968 | Kurtz | .............................. | 285/55 |
| 3,833,984 A * | 9/1974 | Dietzel | ...................... | 29/890.15 |
| 4,229,029 A * | 10/1980 | Boyer et al. | .................. | 285/242 |
| 4,313,628 A * | 2/1982 | Duenke | ......................... | 285/115 |
| 4,549,919 A * | 10/1985 | Auberon et al. | ............. | 156/172 |
| 5,562,311 A | 10/1996 | Sawtelle | | |
| 5,622,393 A | 4/1997 | Elbich et al. | | |
| 6,481,761 B2 * | 11/2002 | Schroeder et al. | ......... | 285/334.3 |
| 7,107,662 B1 * | 9/2006 | Levario | ........................... | 29/505 |
| 2004/0000792 A1 * | 1/2004 | Carhuff | ....................... | 285/414 |

FOREIGN PATENT DOCUMENTS

| | | |
|---|---|---|
| DE | 1 175 504 | 8/1964 |
| EP | 0 515 930 | 12/1992 |
| FR | 2 538 074 | 6/1984 |
| GB | 1 553 220 | 9/1979 |

* cited by examiner

*Primary Examiner* — Aaron Dunwoody
*Assistant Examiner* — Fannie Kee
(74) *Attorney, Agent, or Firm* — Buchanan Ingersoll & Rooney PC

(57) ABSTRACT

A connection device for connecting a line for the transport of media, including a flange with a medium passage for passing through a medium along a flow direction, preferably along an axis of symmetry, and including a clamp. The flange includes a contact section and the clamp includes a clamping section, and the flange and the clamp are separably connectable, so that an end section of the line can be clamped between the contact section and the clamping section. The contact section is inclined with respect to the flow direction, and the clamping section is inclined with respect to the flow direction in an assembled state.

41 Claims, 4 Drawing Sheets

CONNECTION DEVICE

BACKGROUND

1. Field of Invention

The invention relates to a connection device for connecting a line for the transport of media, comprising a flange with a medium passage for passing through a medium along a flow direction, preferably along an axis of symmetry, and a clamping means, the flange comprising a contact section and the clamping means comprising a clamping section, and the flange and the clamping means being separably connectable, so that an end section of the line can be clamped between the contact section and the clamping section.

2. Description of Related Art

From the DE 1175504, such a connection device for connecting a tube to a pipeline is known. The rigid pipe flange (5) in this device comprises a contact section contacting the tube when it is assembled. This contact section is arranged perpendicularly with respect to the longitudinal axis of the pipe or tube. The end section of the tube has a corresponding shape, i.e. it is also arranged perpendicularly with respect to the longitudinal axis of the tube and thus has a flange shape. This elastic flange (1) is fixedly incorporated in the tube. With the aid of a lapped flange (4), the elastic flange (1) is pressed against the rigid pipe flange (5) into a direction in parallel to the longitudinal axis of the pipe or tube, respectively. This is effected via threaded joints. To this end, the pipe flange, flexible flange and lapped flange comprise through bores which are arranged along a hole circle. For connecting the pipe flange, flexible flange and lapped flange, the barrel of the bolts is pushed, for example from the side of the pipe flange, through all aligned through bores until the bolt head adjoins the pipe flange. A nut is put and screwed onto the part of the barrel projecting from the opposite side of the lapped flange, so that it adjoins the lapped flange and moves the same into the direction of the pipe flange, the flexible flange disposed in-between being clamped. For reinforcing the flexible flange, near the hole circle, a metallic back-up ring (3) is inserted into the groove (2) provided in the flexible flange.

In the connection device known from prior art, the relatively high efforts with respect to manufacture and processing for imparting the represented permanent shape of a flange to the end section of the tube are disadvantageous. Equally, the connection of the pipe flange, flexible flange and lapped flange means complicated assembly. For doing so, in the first step, the back-up ring has to be mounted at the flexible flange. Subsequently, all through bores have to be aligned to then mount the threaded joints as described above. It has to be taken care in the process that the individual parts to be connected are not essentially shifted with respect to one another. If, for example, the flexible flange is shifted with respect to the pipe flange, this can result in a step with respect to the internal diameter in the transition from the flexible flange to the pipe flange which can have a negative effect on the flow in this area.

Another disadvantage with the described connection device is the only restricted possibility of applying high forces of pressure on the flexible flange in those areas which are spaced from the working surface of the lapped flange in the radial direction. This has a negative effect above all on the area of the flexible flange which is spaced from the working surface of the lapped flange in a direction radially facing inwards. If the forces of pressure are here insufficient, a complete contact of the flexible flange with the contact section can not be guaranteed. If the contact is incomplete, this results, however, in a gap between the tube and the pipe flange. Due to the described gap, an essential load with respect to the clamped section of the tube can occur due to media penetrating there which can lead to leakages or fractures within the tube.

Another disadvantage with respect to the connection device described in the DE 1175504 is the fact that the flange area of the tube comprises several through bores distributed at the periphery through which the bolts of the threaded joints are inserted. The arrangement of through bores in the flange area of the tube is provided in the known connection device in order to achieve a relatively uniform pressure distribution of the lapped flange on the flexible flange at least in the area of the working surface of the lapped flange. Here, the lapped flange presses with its working surface on a section of the flexible flange following the through bore in the direction radially facing outwards as well as on a section of the flexible flange following the through bore in a direction radially facing inwards. However, said through bores in the flange area of the tube mean essential weakening of the material which can lead to an expansion or stripping of the flange holes.

SUMMARY

It is therefore the object of the invention to provide a connection device which avoids the listed disadvantages of the prior art.

According to the invention, this object is achieved by a connection device of the type mentioned in the beginning in which the contact section is, at least in sections, inclined with respect to the flow direction, and the clamping section is, in the assembled state, at least in sections inclined with respect to the flow direction.

It showed that the connection device according to the invention permits a simple and quick connection between flange, clamping means and line without necessarily having to impart a special shape to the end section of the line beforehand by elaborate and time-consuming measures. Due to the geometry of the contact section, the line can be pushed onto the flange without much effort, the line being simultaneously centred with respect to the medium passage and securely held in an optimised position. The subsequent fixing of the clamping means therefore succeeds without any problems, and the risk of shifting the parts to be connected, in particular shifting the line with respect to the flange or the medium passage, nearly does not exist any longer.

The geometry of the contact section moreover leads to a favourable course of the flow with respect to the internal diameter in the transition from the line to the medium passage. Here, even without any shaping of the end section of the line, the line essentially completely contacts the contact section. Simultaneously, in the assembled state, the clamping means forces the contact of the line with the contact section. The risk of the medium penetrating between the line and the connection device and thus the risk of leakage is thereby clearly reduced.

The clamping of the line between the contact section and the clamping section results in an extremely stable and secure connection due to its geometry that meets highest demands on medium tightness. Here, the result is high force of pressure uniformly distributed across the contact surface which acts on the clamped line. The arrangement of fixing means, such as for example bolts, in the clamping area of the line is here not necessary, and this is why a weakening of the material of the line is avoided in the connection device according to the invention, for example due to through bores.

It can be advantageous for the contact section and/or the clamping section to have, at least in sections, an essentially conical design. In case of a flange, this geometry, for example, permits a simple mounting of the line on the flange. Moreover, it results in a secure and stable clamping of the line between the contact section and the clamping section. At the same time, said geometry is comparably easy and inexpensive to manufacture.

It can be also advantageous for the contact section and/or the clamping section to have an annular design. This results in particular secure and stable clamping between the contact section and the clamping section with uniform squeeze.

Moreover, it can be advantageous for the internal diameter of the medium passage to essentially correspond at least in sections to the internal diameter of the line. This can have a favourable effect on the flow of the medium.

Moreover, it can be advantageous for at least the section of the medium passage facing the line to have an internal diameter essentially corresponding to the internal diameter of the line. This has a particular favourable effect on the flow of the medium in the area of the transition from the line to the flange.

It can be advantageous for the contact section to follow the medium passage in the direction radially facing outwards. This permits a very compact design of the flange.

It can also be advantageous for the contact section to be arranged outside. This has advantages with respect to manufacture and assembly.

It can prove to be favourable for the surfaces forming the outer contour of the contact section to form a cone and include an angle α of between 30° and 90°. This geometry results in a simple assembly of the line on the flange leading to favourable geometric dimensions of the flange and permitting good clampability of the line between the contact and clamping sections.

It can moreover prove to be favourable for the surfaces forming the outer contour of the contact section to form a cone and include an angle α of 60°. This geometry leads to a particularly good combination of a favourable geometric dimension of the flange and good clampability of the line between the contact and clamping sections.

Furthermore, it can be favourable for the contact section to comprise at least one projection. This permits a positive connection between the contact section and the line at least in sections.

In this case, it can be advantageous for the at least one projection to surround the contact section. This results in improved positive locking between the contact section and the projection.

It can moreover prove to be favourable for an annular female section for at least partially receiving the end section of the line to follow the contact section in the direction radially facing outwards. This leads to a very secure retention of the line on the flange during assembly and supports the centring of the line with respect to the flange or the medium passage, respectively.

It can be useful for the female section to comprise a groove. This geometry supports the secure retention of the line on the flange in a favourable manner and is moreover comparably easy to manufacture.

It can be equally useful for the width of the groove of the female section to essentially correspond to the wall thickness of the line. This supports particularly secure retention of the line on the flange.

It can be advantageous for a fixing section to follow the female section of the flange in the direction radially facing outwards. By this measure, on the one hand the fixing of the flange to another part succeeds; on the other hand, this section serves for fixing the clamping means at the flange.

It can be also advantageous for the thickness of the fixing section to correspond to between one third and one sixth of the maximum height of the flange in the area of the contact section. This results in a mechanically stable fixing section that simultaneously only uses relatively little material and thus contributes to the weight reduction of the flange.

It can be moreover advantageous for the fixing section to comprise at least one through bore for fixing the flange at another part. Thus, a possibility for assembling the flange at another part is provided.

It can be moreover advantageous for the fixing section to comprise at least one fixing means for fixing the clamping means at the flange. Thus, a possibility for assembling the clamping means at the flange is provided.

Here, it can be advantageous for the fixing means to have a thread. This results in a particularly simple possibility for fixing the clamping means at the flange.

It can prove to be favourable for the clamping means to comprise a clamping ring with two opposite, essentially parallel surfaces the distance of which essentially corresponds to the maximum height of the flange in the area of the contact section. This permits a surrounding large-surface contact of the clamping means with the line with simultaneously very compact and space-saving dimensions of the parts connected to one another.

It can moreover prove to be favourable for the clamping ring to comprise at least the clamping section on its interior surface. This results in secure and stable clamping of the line between the contact section and the clamping section.

It can moreover be favourable for the clamping section to extend at least to one of the surfaces of the clamping ring. This results in good clamping of the line between the contact and clamping sections with high clamping powers down to the corresponding surface of the clamping ring.

It can be advantageous for the surfaces forming the inner contour of the clamping section and the outer contour of the contact section to be arranged essentially in parallel one to another when they are assembled, the end section of the line being clamped between them. This results in a stable and reliable clamp connection with very uniform squeeze and a large contact surface.

Furthermore, it can be advantageous for the clamping section to comprise at least one projection. This provides the possibility of a connection between the clamping section and the line which at least in sections has a positive fit. Moreover, the projection can have advantages with respect to facilitated assembly of the flange, line and clamping means.

Here, it can be favourable for the at least one projection to surround the clamping section. This permits improved positive locking between the clamping section and the line.

It can be also favourable for the clamping ring to comprise at least one transition section following the clamping section in the axial direction. The transition section causes relief with respect to the squeeze on the line in the corresponding area.

It can be moreover favourable for the clamping ring to comprise a minimum inner radius in the area of the transition section which essentially corresponds to the outer radius of the line. This results in favourable clamp or squeeze relations in the area of the transition section.

Furthermore, it can be favourable for the transition section to comprise a radius in the cross-section. This has a favourable effect on the maximum squeeze or squeeze distribution on the line in the corresponding area.

It can moreover be favourable for the transition section to extend at least to one of the two surfaces of the clamping ring.

This results in favourable clamp or squeeze relations with respect to the line in the area of the surfaces of the clamping ring.

It can also be advantageous for the transition section to comprise a smaller extension in the axial direction than the clamping section. The correspondingly large-surface contact between the clamping section and the line has a favourable effect on the squeeze of the line.

It can be moreover an advantage for the clamping means to comprise at least one through bore. This can bring about advantages with respect to the assembly.

It can also be advantageous for the clamping means to comprise at least one fixing area for fixing the clamping means to the flange. This permits the connection between the clamping means and the flange in a simple manner.

It can be advantageous for the end section of the line to have an essentially conical shape. This facilitates slipping the line on the flange.

It can also be advantageous for the surfaces forming the outer contour of the end section of the line to form a cone and include an angle corresponding to the angle β included by the surfaces forming the inner contour of the clamping section and forming a cone, and the surfaces forming the inner contour of the end section of the line to include an angle corresponding to the angle a included by the surfaces forming the outer contour of the contact section and forming a cone. This results in a particularly good contact of the line with the contact section or the clamping section, respectively, and a correspondingly secure and reliable clamping. Moreover, a particularly easy assembly of the line at the connection device results.

It can be furthermore advantageous if the end section of the line can be clamped between the contact section and the clamping section so as to be impermeable to media. This can prevent leakage of possibly harmful media.

It can prove to be favourable for the end section of the line to be held at least in sections non-positively between the contact section and the clamping section. This permits secure and reliable clamping of the line.

It can moreover prove to be favourable for the end section of the line to be held at least in sections positively between the contact section and the clamping section. The at least in section positive locking advantageously supports the retention of the line between the contact section and the clamping section.

It can furthermore prove to be favourable for the line to be flexible. This brings about advantages with respect to assembly and clamping or the abutment of the line at the contact section or the clamping section, respectively.

It can be advantageous for the line to consist of a polymer material, preferably of an elastomer. Polymer materials are mainly characterized by their good processability and their low weight, moreover, they often possess good chemical resistance. Elastomers are in particular characterized by their extremely high flexibility with a simultaneously high buffering capacity predestining them for applications with vibratory stresses.

It can be a further advantage for the flange and the clamping means to be rigid. This results in mechanical advantages concerning application of force or pressure with regard to the line clamped between the flange and the clamping means.

It can moreover be advantageous for the flange and the clamping means to consist of a metallic material, preferably of aluminium. Metallic materials are characterized by very good mechanical properties, aluminium moreover having a relatively low density, so that, when this material is used, the weight of the flange and the clamping means can be kept low.

The invention also relates to a line for the transport of media with the described connection device.

Below, the operation and function of the invention are illustrated in greater detail.

DETAILED DESCRIPTION

Figure 1A:
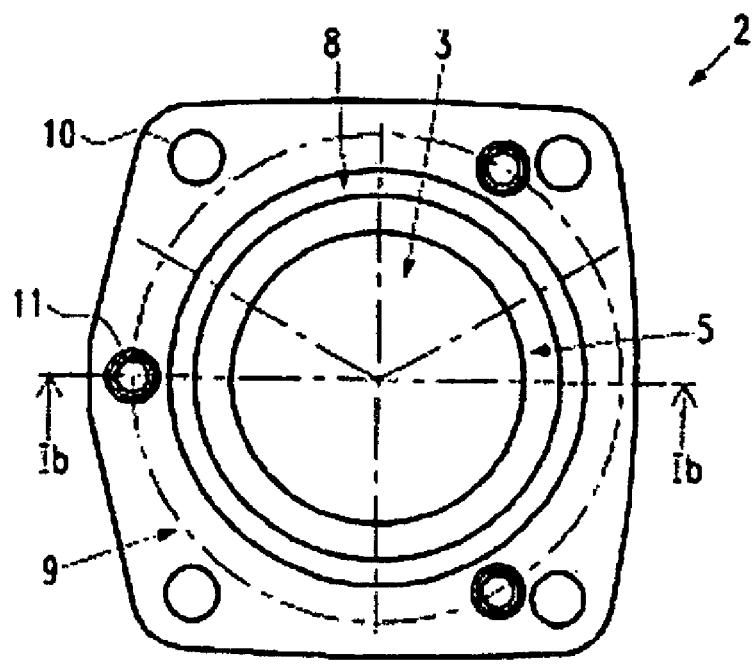
FIG. 1a: shows an embodiment of a flange of the connection device according to the invention in a plan view.
Figure 1B:
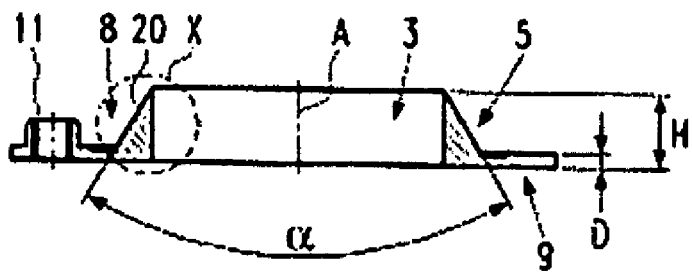
FIG. 1b: shows an embodiment of a flange of the connection device according to the invention in a cross-section along line Ib-Ib.
Figure 1C:
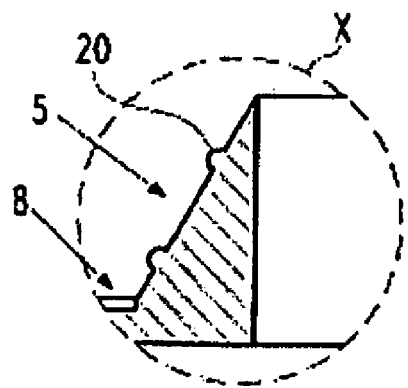
FIG. 1c: shows a representation of a detail X of FIG. 1b.

FIGS. 1a and 1b show an embodiment of a flange of the connection device according to the invention in a cross-section and in a plan view.

The flange 2 consists of a metallic material, preferably of aluminum. In the represented embodiment, the flange has a cylindrical medium passage 3 with the axis of symmetry A. The medium passage has a diameter of approx. 40 mm. The annular contact section 5 following the medium passage in a direction radially facing outwards comprises a male taper. The surfaces forming the male taper here include an angle α 60°. The maximum height of the contact section is approx. 11 mm. The contact section moreover has two surrounding projections 20. More or less projections can also be disposed at the contact section. It is also possible for the projections to be disposed only in sections at the contact section. The annular female section 8 with a groove-like cross-sectional geometry follows the contact section in a direction radially facing outwards. The fixing section 9 of the flange with four through bores 10 and three fixing means 11 are located following the female section. The fixing section 9 has a thickness D.

Figure 2A:
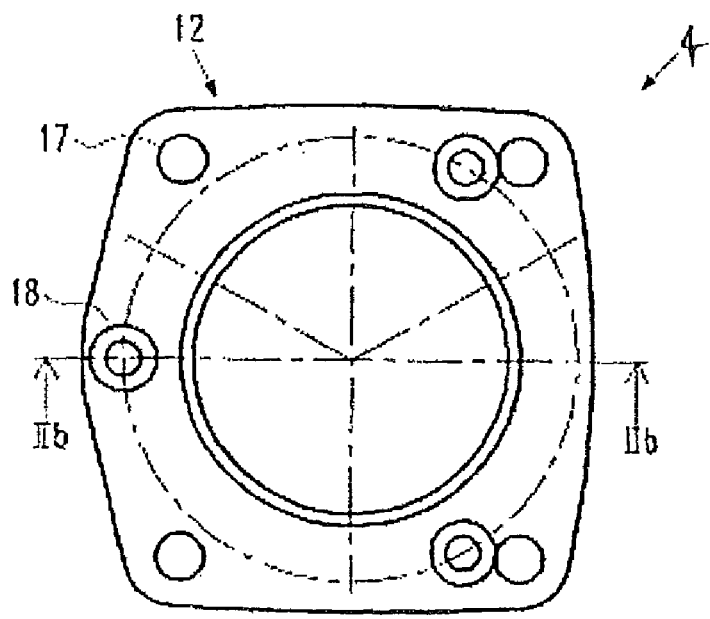
FIG. 2a: shows an embodiment of a clamping means of the connection device according to the invention in a plan view.
Figure 2B:
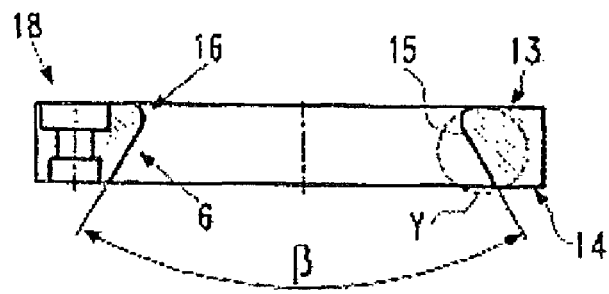
FIG. 2b: shows an embodiment of a clamping means of the connection device according to the invention in a cross-section IIb-IIb.
Figure 2C:
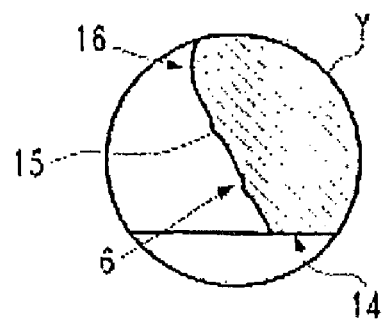
FIG. 2c: shows a representation of a detail Y of FIG. 2b.

FIGS. 2a and 2b show an embodiment of a clamping means of the connection device according to the invention in a cross-section and in a plan view, while FIG. 2c shows a detail of FIG. 2b.

The clamping means 4 consists of a metallic material, preferably of aluminum. In the represented embodiment, the clamping means comprises a clamping ring 12 with two opposite, essentially parallel surfaces 13, 14. The distance of the surfaces 13, 14 is approx. 12 mm. The clamping ring comprises the clamping section 6 and the transition section 16 at its interior surface. The clamping section has a conical shape and extends down to the surface 14 of the clamping ring where it has a diameter of approx. 60 mm. The inner surfaces of the clamping ring forming the cone include an angle β 60°. The clamping section has two surrounding projections 15. The transition section 16 following the clamping section in the axial direction has a radius in the cross-section and extends to the other surface 13 of the clamping ring. The clamping section has a clearly larger extension than the transition section in the axial direction. The clamping ring moreover has four through bores 17 and three fixing areas 18. The fixing areas are doubly stepped through bores.

Figure 3:
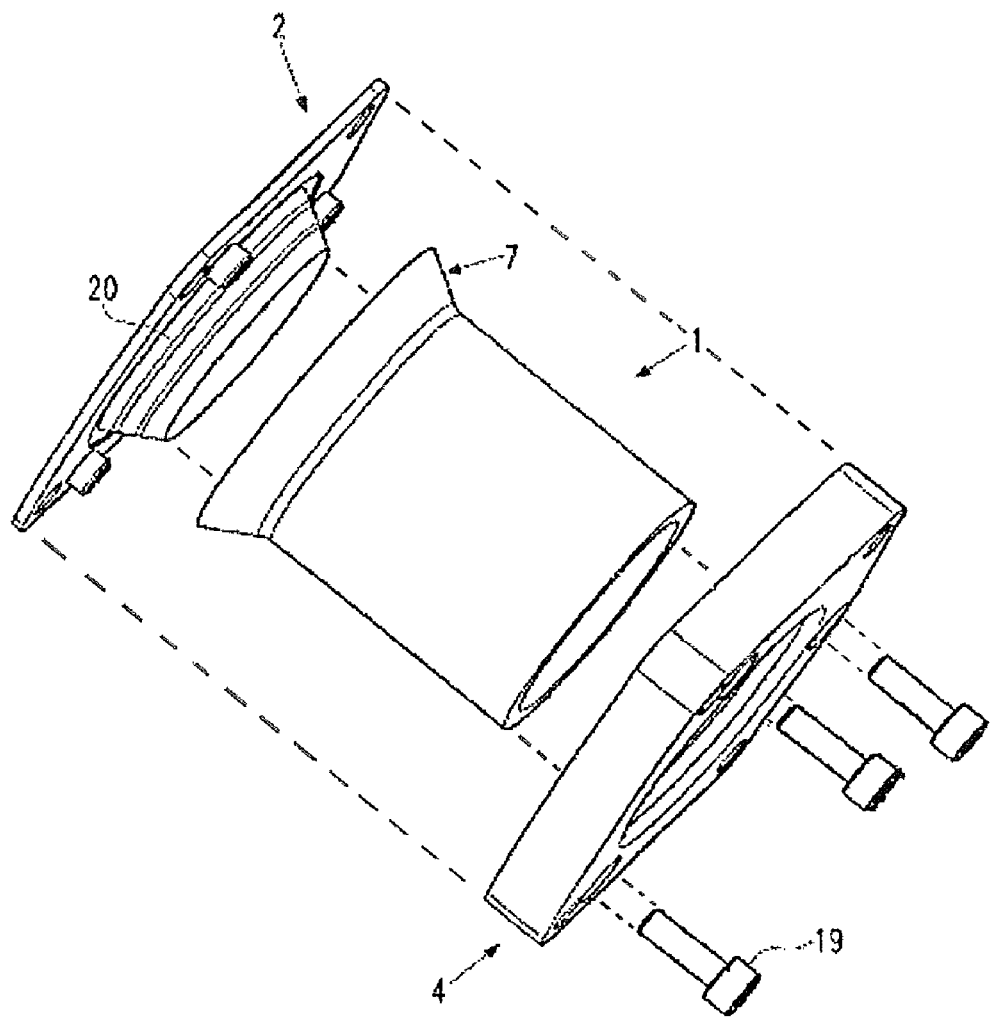
FIG. 3: shows an embodiment of the connection device according to the invention together with the line in an exploded representation.

FIG. 3 shows an embodiment of the connection device according to the invention together with a line in an exploded representation.

The line 1 here has an end section 7 that has a shape conical to the outside. The geometry of the cone corresponds to the conical geometry of the contact section 5 or the clamping section 6. Bolts 19 serve for fixing the clamping means 4 to the flange 2.

Figure 4:
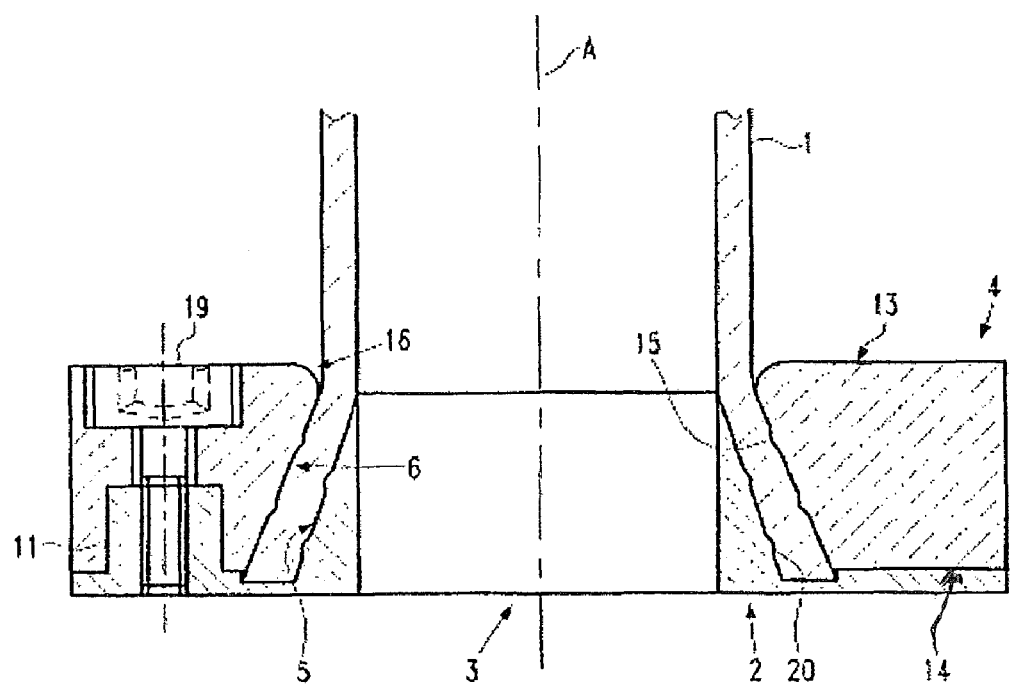
FIG. 4: shows an embodiment of the connection device according to the invention with the line in an assembled state.

FIG. 4 shows an embodiment of the connection device according to the invention with a line in an assembled state.

The clamping means 4 is fixed to the flange 2 by means of bolts 19, the fixing being equally conceivable by using a toggle mechanism, a quick connector or a snap-on fastening. The thread of the bolts 19 is here in engagement with the thread of the fixing means 11. The barrel of the bolt is passed through the fixing area 18 in the form of a doubly stepped through bore, the bolt head contacting the first step of the through bore. The fixing means 11 projects into the fixing area 18 on the side opposite the bolt head and contacts the second step of the through bore. The end section 7 of the line 1 is clamped between the conical contact section 5 and the conical clamping section 6, the surfaces forming the inner contour of the clamping section and the outer contour of the contact section being arranged essentially in parallel one to another. The surrounding projections 15 of the clamping section and the surrounding projections 20 of the contact section are positively connected with the line. The transition section 16 following the clamping section in the axial direction prevents high edge pressure on the line in the area of the surface 13 of the clamping means due to its geometric shape.

Below, the operation and function of the invention are illustrated in greater detail.

The connection device serves for connecting a line for the transport of media and is employed, for example, in the engine room of motor vehicles for fixing a fuel line to a corresponding connection site in the vehicle. In the connection device known from prior art, it is necessary to shape an end section of the line like a flange to press the resulting flange by means of a lapped flange against a further flange, for example a pipe flange, and to clamp it thus between the lapped flange and the pipe flange. This arrangement, however, has, among others, the disadvantage that the above-described flange shaping to the line is relatively complicated. Similar efforts are necessary with respect to the assembly of the known connection device. This is in particular true for the alignment of the medium passage openings of the line flange and the pipe flange, as these should be aligned as precisely as possible. The material weakening existing within the line flange due to through bores in the connection device known from prior art is another disadvantage.

The connection device according to the invention in contrast permits quick and simple assembly, wherein the step of shaping a certain geometry at the end section 7 of the line 1 to be clamped is optional and can thus be omitted. Due to the geometric shape of the contact section 5 of the flange 2 alone, for example by a conical external geometry, it is here possible to push a cylindrical end section of the line without great efforts onto the same, where centering of the line with respect to the medium passage 3 takes place at the same time. The geometric shape of the contact section here also permits a nearly complete contact of the end section of the line to the same. Thereby, the line is already securely and stably held in a centered position on the flange without mounted clamping means 4. This retention or centering, respectively, is supported by the female section 8 of the flange that, for example, has the shape of a groove and follows the contact section in the direction radially facing outwards. Here, the end section of the line can be received at least partially by the corresponding groove.

The clamping means, which had been pushed onto the line, for example in the form of a clamping ring 12, already before the line has been pushed onto the contact section of the flange, is pushed towards the flange after the assembly of the line at the flange until the thread of the bolts 19 incorporated in the fixing areas 18 can engage with the thread of the fixing means 11 of the flange. By tightening the bolts, the distance between the flange and the clamping means is reduced, resulting in the end section of the line being clamped between the contact section and the clamping section 6 over its complete periphery. The clamping section of the clamping ring here preferably has the same geometric shape—for example a conical shape—as the contact section of the flange, so that the surfaces forming the inner contour of the clamping section and the outer contour of the contact section are arranged essentially in parallel one to another in the assembled state. Thereby, a particularly uniform squeeze distribution along the end section of the line is achieved. A transition section 16 that for example has a radius in the cross-section and which follows the clamping section in the axial direction avoids high edge pressures which can lead to a damage of the line.

Projections 15 within the clamping section have a supporting effect when the flange, the line, and the clamping means are connected. For example, if it is not easily possible to manually push the end section of the line onto the flange until it contacts the female section, said projections assist in pushing the line until it abuts the female section. When the bolts 19 of the clamping means are tightened, the same is moved towards the flange and the clamping section with the projections contacts the line. The projections can penetrate the surface of the line and realize a positive connection. This positive connection is now able to ensure better power transmission between the clamping section and the line, so that the line is necessarily caught according to the movement of the clamping means due to the tightening of the bolts. At the same time, for example surrounding projections have an overall favourable effect on the connection as in this area positive locking as well as increased squeeze can cooperate. Said positive effect of the projections 15 at the clamping section can be even increased by projections 20 arranged at the contact section.

The invention claimed is:

1. Connection device for connecting a line for the transport of media, comprising:
   a single-piece flange including,
      a medium passage for passing through a medium in a flow direction, along a longitudinal axis in a thickness direction of the flange,
      a contact section formed radially outwards of the medium passage and including a contact surface, and
      an annular female section formed in a direction radially outwards of the contact section, wherein the female section comprises a groove for at least partially receiving an end section of the line; and
   clamping means, wherein the clamping means includes a clamping surface, wherein the flange and the clamping means are separably connectable, so that the end section of the line can be clamped between the contact surface and the clamping surface, and wherein the contact surface is inclined with respect to the flow direction, and the clamping surface is, in an assembled state, inclined with respect to the flow direction.

2. Connection device according to claim 1, wherein at least one of the contact surface and the clamping surface are substantially conical in shape.

3. Connection device according to claim 1, wherein at least one of the contact surface and the clamping surface are annular in shape.

4. Connection device according to claim 1, wherein an internal diameter of the medium passage essentially corresponds to an internal diameter of a line to be clamped.

5. Connection device according to claim 1, wherein a portion of the medium passage proximal a line to be clamped has an internal diameter essentially corresponding to an internal diameter of the line.

6. Connection device according to claim 1, wherein the contact surface of the contact section forms a cone having an angle of between 30° and 90° relative to the longitudinal axis.

7. Connection device according to claim 1, wherein the contact surface of the contact section forms a cone having an angle of 60° relative to the longitudinal axis.

8. Connection device according to claim 1, wherein the contact surface comprises at least one projection.

9. Connection device according to claim 8, wherein the at least one projection is annular.

10. Connection device according to claim 1, wherein a fixing section is formed to be in a direction radially outwards of the annular female section of the flange.

11. Connection device according to claim 10, wherein a thickness of the fixing section corresponds to between one third and one sixth of a maximum height of the flange in the area of the contact section.

12. Connection device according to claim 10, wherein the fixing section comprises at least one through bore for fixing the flange.

13. Connection device according to claim 10, wherein the fixing section comprises at least one fixing means for fixing the clamping means at the flange.

14. Connection device according to claim 13, wherein the fixing means comprises a thread.

15. Connection device according to claim 1, wherein the clamping means comprises a clamping ring with two opposite, essentially parallel surfaces, whose distance from each other essentially corresponds to a maximum height of the flange in an area of the contact section.

16. Connection device according to claim 15, wherein the clamping ring comprises at least the clamping surface at its interior surface.

17. Connection device according to claim 15, wherein the clamping surface extends at least to one of the parallel surfaces of the clamping ring.

18. Connection device according to claim 15, wherein the clamping ring comprises at least one transition section following the clamping surface in a longitudinal direction.

19. Connection device according to claim 15, wherein the clamping ring comprises a minimum inner radius in an area of a transition section essentially corresponding to an outer radius of a line to be clamped.

20. Connection device according to claim 19, wherein the transition section comprises the minimum inner radius of the clamping ring in cross-section.

21. Connection device according to claim 19, wherein the transition section extends to one of the parallel surfaces of the clamping ring.

22. Connection device according to claim 1, wherein the transition section is shorter in a longitudinal direction than the clamping surface.

23. Connection device according to claim 1, wherein surfaces forming an inner contour of the clamping surface and forming an outer contour of the contact section in an assembled state are arranged essentially in parallel one to another, the end section of the line being clamped between them.

24. Connection device according to claim 1, wherein the clamping surface comprises at least one projection.

25. Connection device according to claim 24, wherein the at least one projection is annular.

26. Connection device according to claim 1, wherein the clamping means comprises at least one through bore.

27. Connection device according to claim 1, wherein the clamping means comprises at least one fixing area for fixing the clamping means with the flange.

28. Connection device according to claim 1, comprising:
a line for the transport of media.

29. Connection device according to claim 1, wherein the flange and the clamping means are rigid.

30. Connection device according to claim 1, wherein the flange and the clamping means consist of a metallic material.

31. Connection device according to claim 28, wherein a surface forming an outer contour of the end section of the line forms a cone and includes an angle corresponding to an angle included by a surface forming an inner contour of the clamping surface and forming a cone, and a surface forming an inner contour of the end section of the line include an angle corresponding to an angle included by a surface forming an outer contour of the contact surface and forming a cone.

32. Connection device according to claim 28, wherein the end section of the line has an essentially conical shape.

33. Connection device according to claim 28, wherein the end section of the line can be clamped between the contact section and the clamping surface so as to be impermeable to media.

34. Connection device according to claim 28, wherein the end section of the line is held between the contact section and the clamping surface.

35. Connection device according to claim 28, wherein the line is flexible.

36. Connection device according to claim 28, wherein the line consists of a polymer material.

37. Connection device according to claim 28, wherein the line consists of an elastomer.

38. Connection device according to claim 28, wherein a width of the groove of the annular female section essentially corresponds to a wall thickness of the line.

39. Connection device according to claim 1, wherein the flange and the clamping means consist of aluminum.

40. Connection device according to claim 1, wherein the clamping means comprises a clamping ring with two opposite, essentially parallel surfaces, whose distance from each other essentially corresponds to and coincides with a maximum height of the flange in an area of the contact section, in an assembled state.

41. Connection device according to claim 1, wherein the flange comprises a male fixing means and the clamping means comprises at least one female fixing area for receiving the male fixing means for fixing the clamping means with the flange.

* * * * *